United States Patent [19]

Habeger, Jr. et al.

[11] 4,093,947

[45] June 6, 1978

[54] RASTER DISPLAY POSITION DETECTION

[75] Inventors: Charles C. Habeger, Jr.; Dennis A. Quy, both of Bartlesville, Okla.

[73] Assignee: Phillips Petroleum Company, Bartlesville, Okla.

[21] Appl. No.: 755,761

[22] Filed: Dec. 30, 1976

[51] Int. Cl.² ............................................. G06F 3/14
[52] U.S. Cl. ................................. 340/324 AD; 178/18
[58] Field of Search ................... 340/324 A, 324 AD; 178/18, 19, 20

[56] References Cited

U.S. PATENT DOCUMENTS

| | | | |
|---|---|---|---|
| 3,342,935 | 9/1967 | Leifer et al. | 178/19 |
| 3,399,401 | 8/1968 | Ellis et al. | 178/18 |
| 3,912,860 | 10/1975 | Sasabe et al. | 178/18 |

Primary Examiner—Marshall M. Curtis

[57] ABSTRACT

In order to accurately detect and commmunicate the position of a data location in a raster type luminescent display utilizing light-sensitive detection means, the permitted response time for the light detection means is extended by allowing detection of only a portion of the data locations during each scan of raster display means. Maintenance of a predetermined relationship between the number of raster scans in a detection cycle and the particular data locations for which detection is possible on each scan permits exact definition of a target data location. Detection is aided by the superimpositon of a luminescent cursor associated with each data location for which detection is permitted as the raster display is scanned.

29 Claims, 8 Drawing Figures

RASTER DISPLAY POSITION DETECTION

This invention relates to a method and apparatus for communication of position location on a raster display. In another aspect the invention relates to a method and apparatus for communicating the location of a position on a raster display by sensing the emission of light associated with that position. In still another aspect the invention relates to a method and apparatus for providing accurate position detection of a data location in a raster display utilizing detection equipment which is incapable of responding to the detection of light from the display within the time that it takes a single data location to be scanned. In another aspect the invention relates to a method and apparatus for generating a set of cursors associated with one or more preselected data locations of a raster display.

In communication processes where information is displayed on the face of a cathode ray tube or other similar luminescent display apparatus it is known to use a light sensing device or "light pen" to detect illumination emanating from the display and, by using the time at which the light is sensed, determine from the scanning pattern which produces the display the position at which the light was sensed. With some types of display equipment, however, particularly a display generated by a raster-type scanning system, extremely high speed and accurate detection equipment is necessary to insure the resolution necessary to detect the position of a single character or single data location. Although this required accuracy will obviously vary somewhat depending upon the size of the data location and the scanning rates of the raster display equipment, in raster display equipment utilizing substantially the same scanning rates as the standard U.S. television receiver and providing eighty possible data locations across the face of the display area from one side or the other, it would be necessary to provide detection equipment which could sense the presence of light at a particular data location and deliver a signal to associated timing equipment within about 600 nanoseconds or less, the time which it takes the raster beam to scan the width of one character space, to insure one-character resolution. Although sensing equipment can be built to such accuracy, it is desirable to permit sensing of the position of a data location using less sophisticated detection equipment. The use of such less sophisticated detection equipment is particularly desirable in situations where the equipment will be subjected to relatively rugged use.

Accordingly, an object of the invention is to provide a method and apparatus for communication of position location on a raster display. Another object of the invention is to provide a method and apparatus for communicating the location of a position on a raster display by sensing the emission of light associated with that position. Still another object of the invention is to provide a method and apparatus for providing accurate position detection of a data location in a raster display utilizing detection equipment which is incapable of responding to the detection of light from the display within the time that it takes a single data location to be scanned. Another object of the invention is to provide a method and apparatus for generating a set of cursors associated with one or more preselected data locations of a raster display.

In accordance with the invention, for a display system wherein a luminescent display is generated by raster scanning in which a plurality of scans in a first direction during each successive scan in a transverse direction which is generally perpendicular to the first direction, and having at least one row of successive data locations along the first direction of the display, there is provided a method and apparatus for communicating the position of a target data location selected from the data locations of said display by superimposing over the display a luminescent cursor associated with preselected, periodic, nonsuccessive data locations in each row thereof, then shifting each cursor a preselected number of data locations along each row during each of a preselected number of preselected transverse direction scans in order to provide display of a cursor associated with each data location of the display at least once during a cursor cycle. During the superimposition and shifting of the luminescent cursors, a method and apparatus are provided for maintaining a signal message representative of the position of the data location which has most recently had a cursor associated therewith and for initiating communication of the signal message representative of the target data location in response to the sensing of luminance produced by a cursor associated therewith.

While the scans in the first direction and transverse direction perpendicular thereto referred to hereinabove can have any desired orientation, for simplicity of explanation the invention will be discussed primarily in terms of a preferred embodiment thereof wherein the raster scanning system is similar to that used in conventional U.S. television sets, except for the absence of interlacing scan pattern, wherein the above-mentioned first direction is a horizontal direction across the screen and the above-mentioned transverse direction is a vertical direction. In such a system each row of data locations along the first direction would be a horizontal row of data locations or characters displayed on the face of the display area or cathode ray tube face. It is to be understood, however, that the method and apparatus of the invention would be equally applicable to a row of vertical data locations on a raster display tube having the respective scan directions oriented perpendicular to those of the standard U.S. television receiver.

In a preferred embodiment of the invention, the period of time between the generation of consecutive cursors across a horizontal line of data locations on the face of a cathode ray tube is selected to provide sufficient response time to permit accurate determination of exact data location as hereinafter described. Although the period or distance between successive cursors remains constant, during each vertical scan of the display area each cursor position is shifted laterally to the immediately adjacent data location. In such a system a cursor will have appeared associated with each data location at the completion of a number of vertical scans equal to the number of character locations from the start of one cursor to the start of the next.

When a cursor is sensed by the light pen or other detection equipment used, generation of cursors associated with other data locations is ceased, but generation of the cursor associated with the target data location from which a cursor has been sensed is continued in order to permit visual inspection and confirmation that the proper target data location has in fact been selected. When such confirmation has been made, means are provided for transferring a signal representative of the position of the selected target data location to auxiliary equipment or otherwise communicating a signal representing the position of the target data location.

The method and apparatus of the invention are particularly advantageous in their ability to provide accurate position information using reliable, simple, and relatively inexpensive light detection equipment.

Additional objects and advantages of the invention will be apparent from the specification and claims as well as from the following detailed description of the drawings in which

Figure 1:
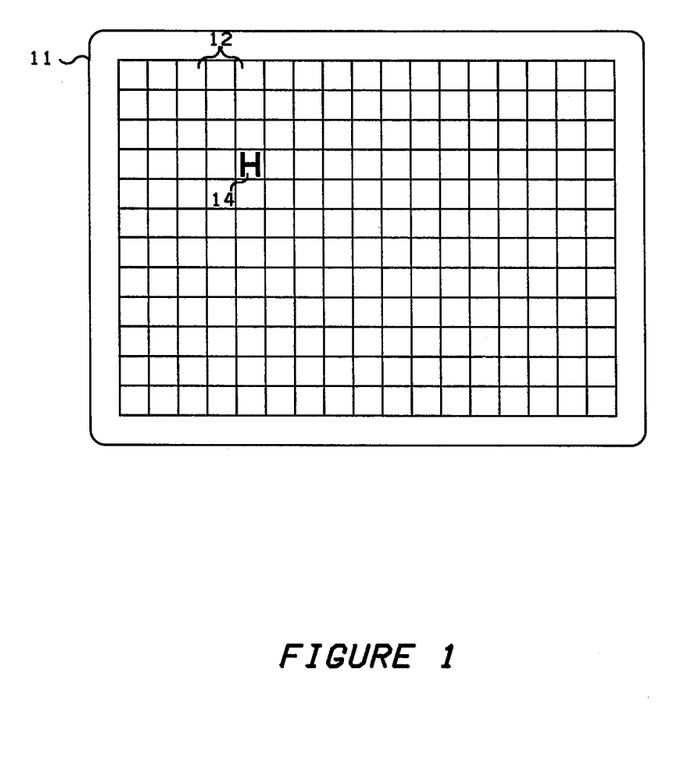
FIG. 1 is a schematic illustration of a display field of a type with which the invention is particularly useful.

Referring to FIG. 1 there is illustrated a field of display 11 which has schematically illustrated thereon a plurality of data locations 12. The data locations 12 are each capable of displaying any letter, number, line segment, or other graphics or symbols which the circuitry associated with the generation of the raster data display, known in the art, is capable of generating. The data locations or character spaces 12 are arranged in a plurality of horizontal rows. In the example illustrated by FIG. 1 there are twelve rows of data locations with seventeen data locations in each row. The raster sweep by which the display is produced is characterized by a plurality of sweeps in a first or horizontal direction for each sweep in a transverse or vertical direction. The rows of data locations 12 therefore run in the same direction as the first direction or horizontal direction sweep of the raster display generation means. Although the data locations 12 illustrated by FIG. 1 are outlined for the purpose of illustration, such lines would not ordinarily be present on the face of an actual display system, but the areas included within such lines would nonetheless be designated as data locations 12. In the preferred embodiment of the invention illustrated there is no space between adjacent data locations within a row and no space between adjacent rows of data positions. While such an arrangement of data locations is preferred for the purpose of permitting maximum utilization of available display area as well as continuity of graphic display presentations, the invention is equally applicable to display formats where there is space between adjacent data locations within a row and/or space between adjacent rows of data locations. Likewise, although the illustrated data locations 12 of FIG. 1 do not fill the entire viewing area, all the usable viewing area of the display field could be filled with data locations as required.

Figure 2:
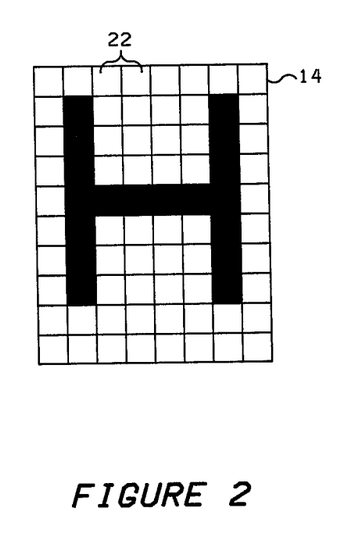
FIG. 2 is a schematic illustration of a single data location of the display field of FIG. 1.

As an example of the type of information which is suitable for display within a data location, a representation of the letter H is illustrated as being presented by a data location 14. FIG. 2 is a schematic illustration of the data location 14 illustrating the manner in which the letter H is displayed within a data location. The data location 14 is divided into data bit locations 22 which are arranged, in the preferred embodiment illustrated by FIG. 2, in ten horizontal data bit rows having eight data bits in each row. The scale of the rows of data bits 22 is such that each horizontal row of data bits is covered by one horizontal scan of the raster display generation means with the first horizontal scan for a row of data locations 14 generating the information to appear on the top row of data bits 22, the second horizontal scan providing the information in the second row of data bits 22, and so on until the tenth row of data bits 22 is provided by the tenth scan of the horizontal sweep of the raster for that row of data locations 14.

Figure 3:
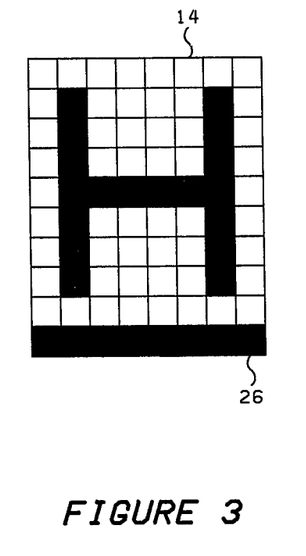
FIG. 3 is a schematic illustration of the data location of FIG. 2 showing a preferred cursor format superimposed thereon.

When generation of a signal representative of the position of a data location within the matrix of data locations of the display field 11 is desired, or when transmission of such position information or communication with other equipment requiring such position information is desired, a cursor which can be suitably viewed by a light detecting apparatus such as a light pen is superimposed at a preselected position within each data location. The appearance of a cursor 26 filling the entire tenth scan line of the data location 14 is illustrated by FIG. 3. While the particular cursor used in any specific application can be of any size, shape, or other disposition as appropriate, the presently preferred use of the final scan for a row of data locations 12 is preferred since it presents a minimum of interference with other display functions.

While FIGS. 1-3 each show the displayed alphanumeric and cursor in black, the black areas of these figures would, in a luminescent display, ordinarily be those areas which are lighted.

The presently preferred embodiment of the invention is particularly suitable for use with a display field 11 having 24 rows of data locations with eighty data locations in each row and with no space between adjacent data locations in the same row or between adjacent rows. Using such a display format, 240 horizontal scans will be required to cover the area from the uppermost row of data bits in the first row of data locations to the lowermost data bit row in the lowermost row of data locations. Using the bottom or tenth scan line of each row of data locations as the cursor location, generation of cursors for communication with a light pen or other suitable detection apparatus will be limited to each tenth horizontal scan of the display raster.

During normal operation of the luminescent display apparatus, no cursors will be present on the display screen. When communication of a data location position within the display field 11 is desired, generation of the "flying" cursor display is initiated. While, as previously discussed, generation of cursors for each data location 12 of a horizontal row of data locations would require sensing, signal generation, and other action by the light pen and associated apparatus within about 600 nanoseconds if the cursors associated with each data location in a data location row were all generated on one-tenth line sweep of the data locations in that row, flying cursor detection in accordance with the invention can be accomplished with the same degree of accuracy using much less sophisticated equipment. The flying cursor is generated by selecting a space between successive cursors in a row of data locations to permit ample time for cursor recognition and electronic circuit response prior to the appearance of another cursor. In this way the required response time for the cursor recognition system is lowered from the length of time it takes the horizontal raster sweep to scan across one data location to the time required for the same horizontal beam to sweep from one cursor location to the next. In order to permit the generation and availability for detection of a cursor associated with each data location of the display, cursors appear at different preselected data locations during each vertical sweep of the raster display until all data locations have been served whereupon the generation of the flying cursor display cycle repeats until detection of the cursor associated with a target data location is accomplished or until a preselected period of time has expired.

While any desired spacing between consecutive cursors in the flying cursor pattern can be utilized, the apparatus required for cursor generation is greatly simplified if all cursor spacings are identical. Further simplification is possible if a cursor appears at every $2^n$th data location where $n$ is a positive integer since such an arrangement provides greater ease of exact cursor location determination as will be hereinafter more fully discussed. Using the presently preferred spacing of one cursor each 8 data locations, a spacing particularly well adapted for use with a display format wherein there are 80 data locations in each horizontal data location row, upon initiation of the flying cursor signal, a cursor will appear at the first, eighth, sixteenth, twenty-fourth, thirty-second, etc. data location of each row. On the next vertical sweep of the raster display, a cursor will appear superimposed on the second, ninth, seventeenth, twenty-fifth, thirty-third, etc. data location of each data location row. Similarly, the position of each cursor will shift one place to the right on each succeeding vertical sweep of the display with the pattern repeating until detection of a cursor associated with a target data location is accomplished or until a preselected time has elapsed.

When detection of a cursor by a light pen is accomplished, generation of the flying cursor display is automatically terminated and a fixed display of the detected cursor associated with the target data location is initiated. This permits the operator to observe the exact position of the detected target data location to insure that the proper target has been found. During such a fixed cursor display action can be initiated to transfer a signal representative of the position of the target data location to other equipment or to otherwise communicate a signal representative of the position of the target data location. If no transfer of position information is initiated within a preselected time, generation of the fixed confirmation cursor will be terminated automatically.

Figure 4:
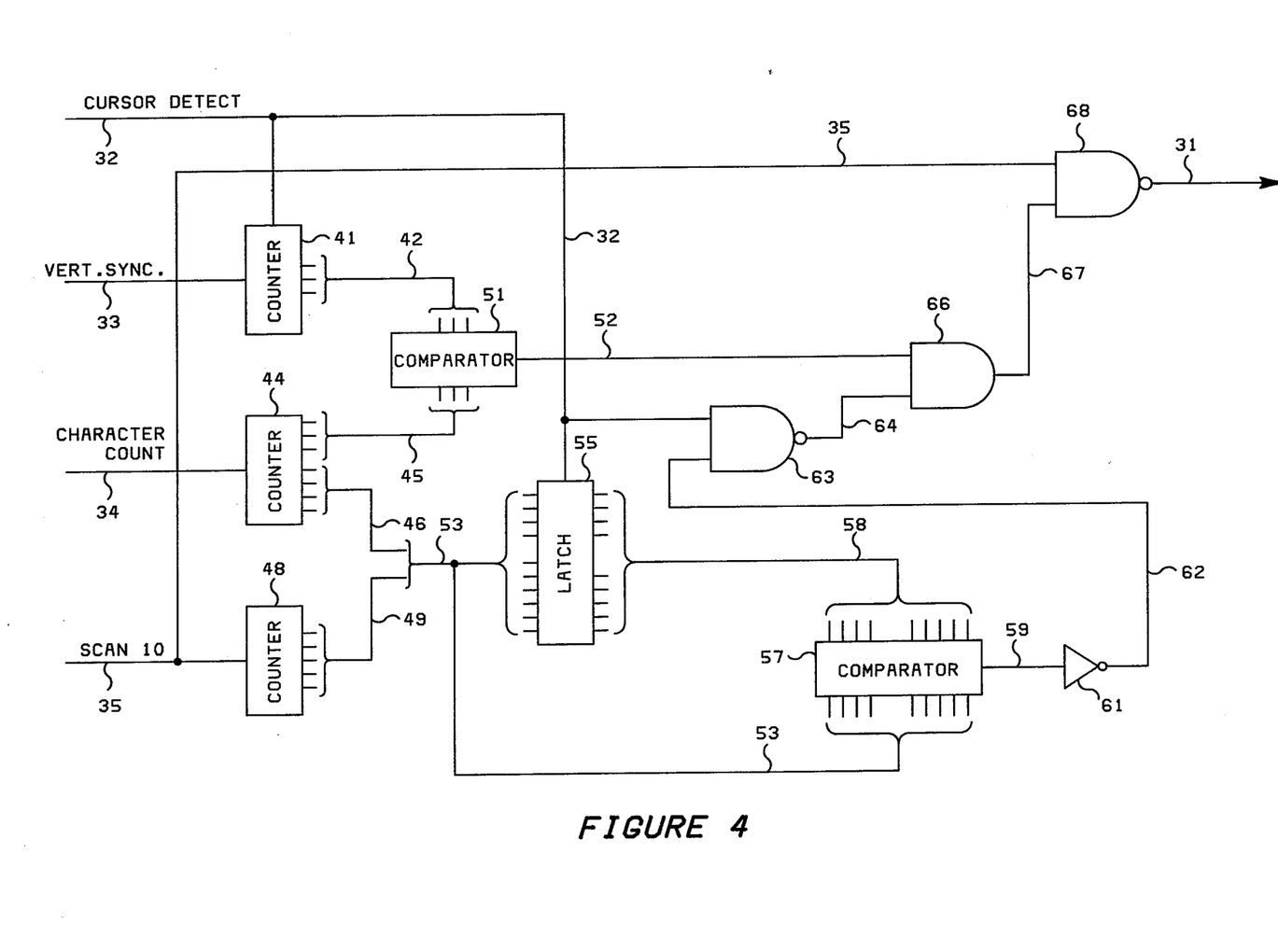
FIG. 4 is a schematic block diagram of a cursor generation apparatus operable in accordance with the invention.

A further understanding of the operation of the method and apparatus of the invention is provided by FIG. 4 which illustrates in schematic block diagram from the manner in which a cursor generation signal 31 capable of supplying both a flying cursor and fixed confirmation cursor display is generated in response to a cursor detect signal 32 which is generated when a light pen or other sensing device detects a cursor on the luminescent display, a vertical synchronization signal 33 provided by the standard vertical synchronization signal associated with the preferred television-type raster display, a character count signal 34 which delivers one count pulse per character or data location scanned by the horizontal beam of the raster display, and a tenth scan signal 35 which is delivered each time the tenth or last scan of a row of data locations is being scanned by the horizontal beam. The character count signal 34 can be provided by the display circuitry known in the art which is utilized to arrange the alphanumeric and other line data into data location format suitable for use in a raster display or can be provided by any suitable separate clock means operating at a rate suitable to coincide with the rate at which individual data locations are crossed by the horizontal scanning beam. Likewise, the tenth scan signal 35 will ordinarily be readily obtainable from the formatting circuitry associated with the raster display but can also be provided by application of the horizontal sweep wave form to a divide-by-ten counting circuit.

The vertical synchronization signal 33 is provided to a counting means 41 which provides a three-bit binary output signal 42 representative thereof. The character count signal 34 is provided to a counting means 44 which delivers in response thereto a seven-bit binary output comprising the three least significant bits 45 and the four most significant bits 46 of the output count. The tenth scan signal 35 is provided to a counting means 48 which provides a five-bit output signal 49 representing the total number of tenth scan signals received thereby. At the time flying cursor generation is to be initiated, all the counters 41, 44 and 48 have been reset to preselected initial conditions and are being maintained at such initial conditions. When flying cursor generation is initiated the counting means 41, 44 and 48 begin counting. The output count signal 42 of the counter means 41 is delivered as an input to a comparator means 51. In addition, the three least significant bits 45 of the output count of the counting means 44 are provided as inputs to the comparator 51. The characteristics of the comparator 51 are such that the output signal 52 thereof is a logic 1 whenever the count represented by signal 42 is the same as the count represented by signal 45 and is a logic 0 at all other times. The four most significant bits 46 from the counting means 44 and the five-bit count output 49 of the counting means 48 are combined to form a signal 53 which is provided as an input to a latch means 55 and is also provided as one of the inputs to a comparator means 57. The nine-bit output of the latch circuit 55 is provided as a signal 58 to the comparator 57. The characteristics of the comparator means 57 are such that when signals 53 and 58 are identical the output signal 59 of the comparator means 57 will be a logic 1, and at all other times the output signal 59 will be a logic 0. The output signal 59 of the comparator means 57 is provided to an inverter means 61 which delivers an inverted comparator output signal 62 as one of the inputs to a NAND circuit 63. The cursor detect signal 32 is provided as the other input to the NAND circuit 63. The output signal 64 of the NAND circuit 63 and the output signal 52 of the comparator 51 are provided as inputs to an AND circuit 66. The output signal 67 from the AND circuit 66 and the tenth scan signal 35 are delivered as inputs to a NAND circuit 68 which delivers the cursor generation signal 31 as the output thereof.

As generation of a flying cursor display is initiated by performing the necessary switching operation such as closing a switch in the tip of a light pen by touching the light pen tip to the face of the cathode ray tube, appropriate switching circuits provide enabling signals to the counting means 41, 44 and 48. The initial logic 0 condition of the cursor detect signal 32 will provide a logic 1 output signal 64 from the NAND circuit 63. In this condition an output signal 31 having a 0 logic state calling for the display of a cursor will be generated each time the tenth scan signal 35 is in a positive logic state, indicating that the tenth line of a row of data locations is being scanned, and the input signals 42 and 45 to the comparator 51 are identical resulting in a logic 1 comparator output signal 52. The total seven-bit output signal from the counting means 44 is, at any given time, representative of the distance in data locations through which a horizontal scan is complete. Were it possible to freeze the state of the counter means 44 within the 600 nanosecond time limit previously discussed, the output of the counting means 44 including the three least significant bits 45 and the four most significant bits 46 could be stopped upon recognition of a cursor signal by the light pen and the exact horizontal position of the sensed data location will be known. However, in accordance with the invention the three least significant data bits 45 from the counting means 44 are instead compared to the output signal 42 of the counting means 41 in order to generate a cursor only when the signals 42 and 45 are equal. Although the initialization of the various counting means can be adapted to suit the particular circuitry and purpose of any specific application, assuming for discussion an initial setting of all zeros on both counters 41 and 44, the output signals 42 and 45 will initially be equal and will subsequently be equal each eight counts during the entire time of the first vertical scan of the display. A cursor will therefore appear during every tenth line of the scan at every eighth data location across the row of data locations being scanned—each time the three least significant bits 45 of the counter 44 are all zero. The counting means 44 is reset or otherwise appropriately initialized at the end of each horizontal scan to provide cursors appearing at the same relative horizontal position in each of the data location rows in the display. As the raster display is scanned the output signal 42 of the counting means 41 therefore provides a signal representative of the exact cursor position within a group of eight adjacent data locations of a specific row, the four most significant bits 46 of the counter means 44 designate the position of the group of eight data locations being scanned within the eighty data location row, and the five-bit output signal 49 of the counting means 48 defines the vertical position of the row being scanned.

At the end of the first vertical scan when all 240 horizontal lines have been scanned, the scanning sequence is reinitiated by a vertical synchronization signal which, at the same time, augments the output of the counting means 41 to provide, under the conditions assumed above, a signal 42 equivalent to the decimal 1. Continued operation as previously discussed is maintained through a complete second vertical scanning trace exactly as previously described except that on the second scan the augmented signal 42 will match the three least significant bits 45 of the counting means 44 on the second, ninth, seventeenth, etc. character count and each cursor will be displaced laterally one data location from the position of the corresponding cursor generated during the first vertical sweep. This procedure will continue with the vertical synchronization counter 41 being augmented by one additional count during each succeeding vertical sweep to generate the flying cursor pattern and will continue such operation until a cursor is detected at the target location by the light pen.

When a cursor is detected by the light pen, the cursor detect signal 32 changes from a logic 0 to a logic 1 stopping the counting means 41 and maintaining the current count therein and latching or recording the present value of the signal 53 containing the four most significant bits 46 from the counting means 44 and the five bits 49 from the counting means 48 and provides these values as a constant input signal 58 to the comparator means 57. The alteration of the cursor detect signal from a logic 0 to a logic 1 also drives the output signal 64 of the NAND circuit 63 to a logic 0 as long as the output signal 59 of the comparator means 57 remains a logic 0 and thereby effectively inhibits the generation of a logic 0 cursor enable signal 31 except when the output signal 42 of the stopped counting means 41 and the three least significant bits 45 of the counting means 44 are equal, the tenth line of a row of data locations is being scanned, and the nine bits of signal 53 exactly match their latched counterpart bits of signal 58. This condition is fulfilled only when the scanned position is the position at which the cursor was detected, and the flying cursor display therefore automatically changes to a fixed confirmation cursor display at the target location as soon as the presence of a flying cursor is detected at the target location.

It can readily be seen that even though the horizontal scan may continue across as many as seven data locations while the signal sensing the flying cursor is being transmitted to the counting means 41 and latch means 55, and although the three least significant bits 45 of the counting means 44 will have changed during that time, the output signal 42 of the counter 41, the four most significant bits 46 of the counter 44, and the five output bits 49 of the counter 48 will not have changed and will still define the exact data location at which the cursor was sensed.

During the time that the counting means 41 is stopped and the latch means 55 has been actuated to limit cursor generation to production of a single confirmation cursor at the target location, means are provided by which the three data bit signal 42 and nine data bit signal 58 can be transmitted to a computer, another display unit, a printer, or any other desired location or apparatus for any desired purpose. Examples of such purposes would include, but are certainly not limited to, alteration of a process value displayed at the target location, alteration of all or a portion of the data displayed on the display field, and many other similar useful purposes.

Figure 5:
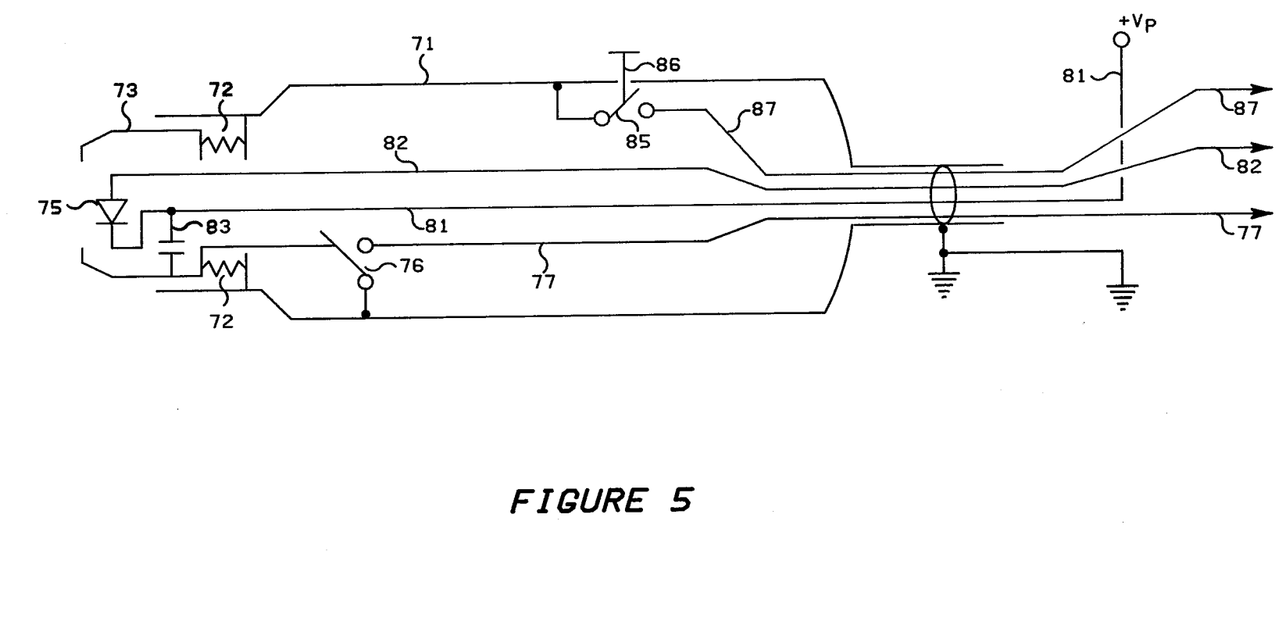
FIG. 5 is a schematic illustration of a preferred light pen which can be used in conjuction with the invention.

A light pen type detector and switching means suitable for use in conjunction with the method and apparatus of the invention is illustrated by FIG. 5. An electrically grounded case structure 71 has movably mounted at one end thereof by mounting springs 72 or other suitable means a movable tip 73 containing a photodiode 75 or other suitable light sensing means. As the tip 73 of the light pen means is pressed against the face of a cathode ray tube, for example, to place the photodiode 75 in position to receive light from a cursor on the screen, the spring means 72 are compressed and a switch means 76 is closed, thereby grounding an electrical line 77 and initiating the generation of a flying cursor display. The photodiode is connected to a suitable power source by means of a power supply line 81, and the photodiode signal is provided to the associated process equipment through a signal line 82. The power supply line 81 is capacitor coupled to the light pen ground through a capacitor 83. A switch means 85 having actuating means 86 associated therewith to permit switch operation by an operator is adapted to effectively ground a signal line 87 to initiate transfer of target data location information following sensing of a flying cursor, automatic generation of a stationary confirmation cursor, and verification that the confirmation cursor is in fact associated with the desired target location.

Figure 6:
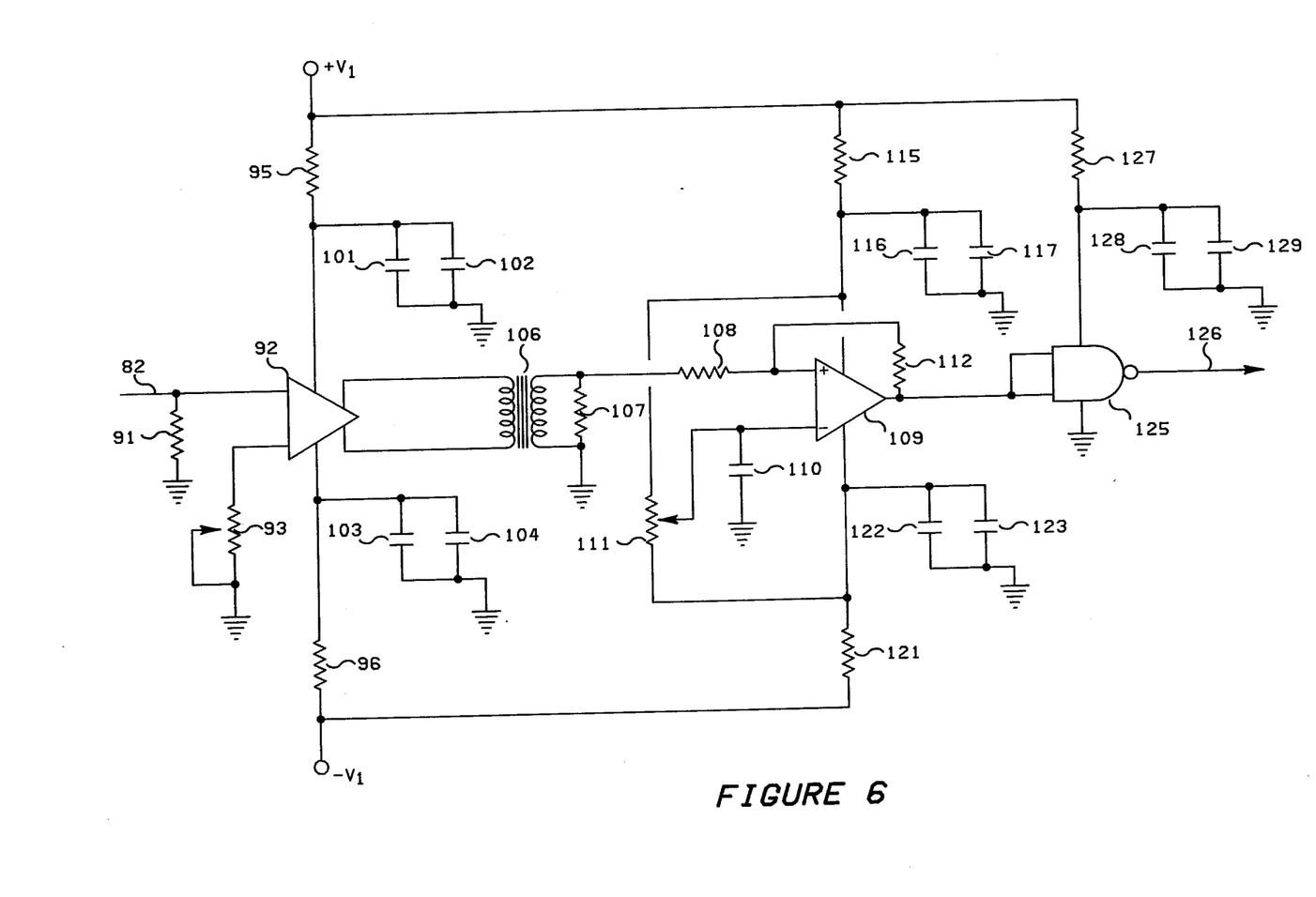
FIG. 6 is a detailed electrical schematic diagram of a light pen preamplifier circuit for use with the light pen of FIG. 5.

FIG. 6 illustrates a presently preferred circuit for providing preamplification and conditioning of the output signal from the photodiode 75 of FIG. 5. The output signal 82 from the anode of the photodiode circuit is converted from a current to a voltage level by a resistor 91 and is provided as an input to a high frequency video amplifier 92 having a differential input and output. The other differential input terminal of the amplifier 92 is connected to ground through a potentiometer 93 adapted to serve as a variable resistor. Power is provided through the amplifier 92 from a positive voltage supply $+V_1$ through a resistor 95 and from a negative voltage source $-V_1$ through a resistor 96. The positive power supply terminal of the amplifier 92 is connected to ground through the parallel combination of capacitors 101 and 102, and the negative power supply terminal of the amplifier 92 is connected to ground through the parallel combination of capacitors 103 and 104. The differential output of the amplifier 92 is connected to the primary coil of a transformer 106 with the secondary coil of the transformer being connected in parallel with a resistor 107. One side of the resistor 107 is grounded with the other side being connected through the resistor 108 to the positive input of a voltage comparator amplifier 109. The negative or inverting input of the amplifier 109 is connected through a capacitor 110 to ground and is connected to the sweep terminal of a potentiometer 111 having its resistance connected between the positive and negative power input terminals of the amplifier 109. The output of the amplifier 109 is connected to the inverting input thereof through a feedback resistor 112. The positive power input terminal of the amplifier 109 is connected through a resistor 115 to a positive voltage source $+V_1$ and through the parallel combination of capacitors 116 and 117 to ground. The negative power supply terminal of the amplifier 109 is connected through a resistor 121 to a negative voltage source $-V_1$ and through the parallel combination of capacitors 122 and 123 to ground. The coupling of the output of the amplifier 109 to the positive input thereof through the resistor 112 provides a Schmitt trigger action. A NAND circuit 125 accepts the output of the amplifier 109 as both inputs thereto and converts the output of the voltage comparator amplifier 109 to a transistor-transistor logic (TTL) compatible binary signal 126 suitable for triggering appropriate flip-flops or other equipment to generate a signal corresponding to the cursor detect signal 32 of FIG. 4. The NAND circuit 125 is supplied with operating power from a positive voltage source $+V_1$ through a resistor 127 to the positive or logic 1 input terminal thereof. This input terminal is also connected through the parallel combination of capacitors 128 and 129 to ground.

As can be seen from a review of the light pen apparatus illustrated schematically in FIGS. 5 and 6, the preferred light pen does not require preamplification within the pen itself and is able to make use of circuitry which is straightforward, sturdy, and relatively inexpensive. This simplicity of construction and the durability and reliability attendant thereto is made possible by the relaxed light sensing response time which can be tolerated in the practice of the invention.

Figure 7:
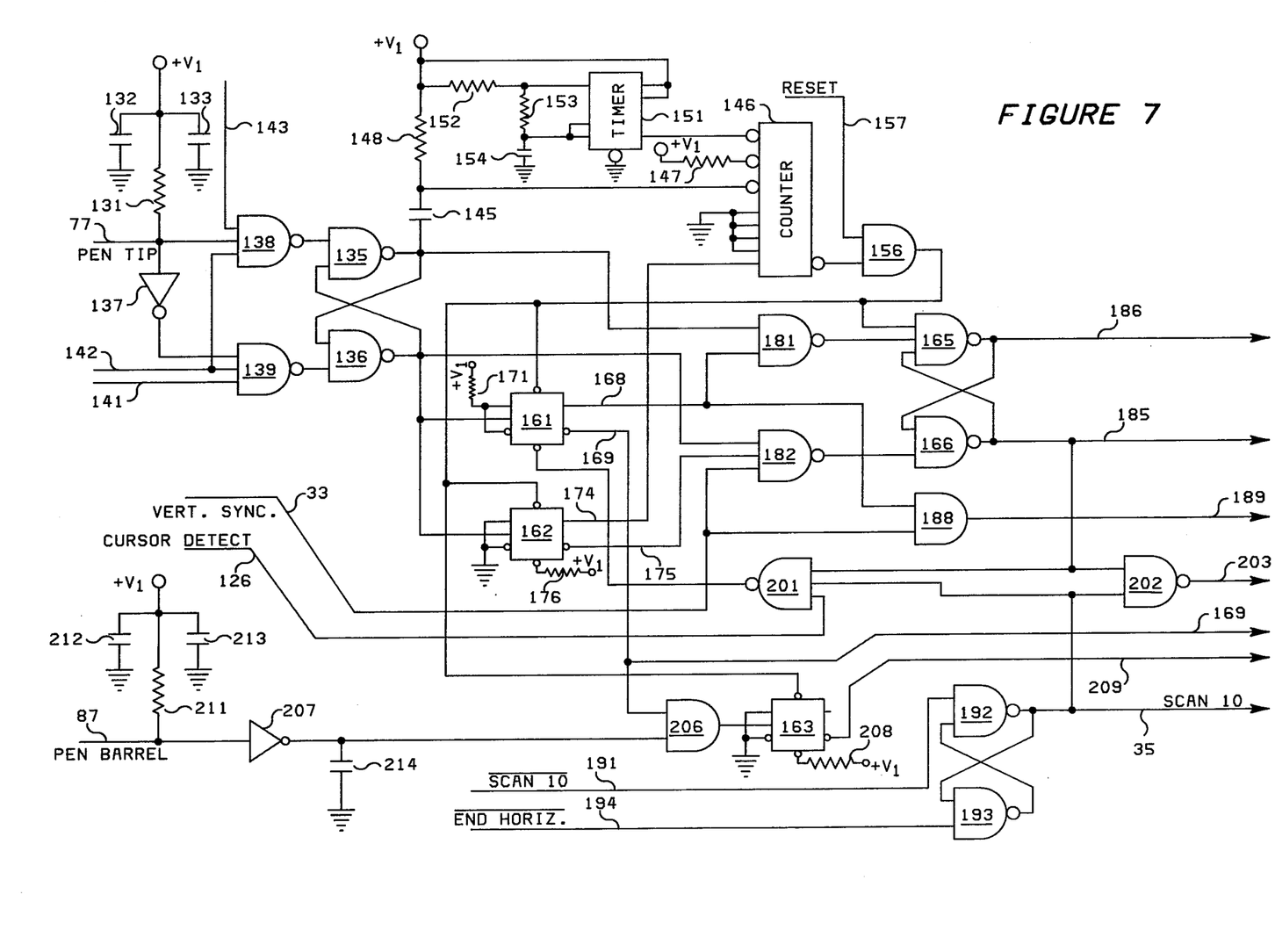
FIGS. 7 and 8 are detailed electrical schematic diagrams of signal generating apparatus comprising a particularly preferred embodiment of the invention.
Figure 8:
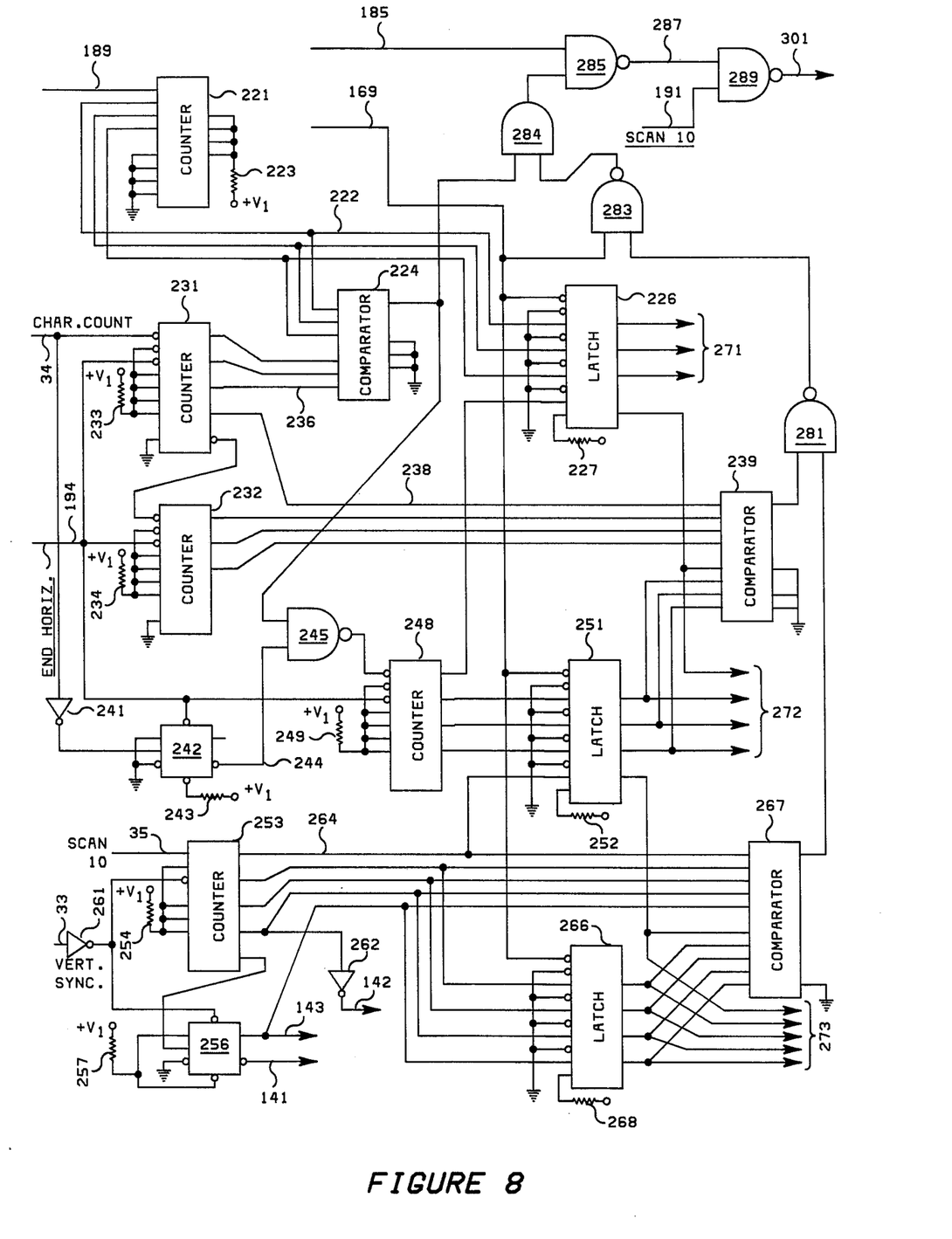

FIG. 7 is a detailed schematic diagram of the switching and enabling circuits which are presently preferred for use in implementing the invention. When the tip switch 76 of the light pin (FIG. 5) is closed, line 77 from the pen tip is grounded. Line 77 is connected through a resistor 131 to a positive logic 1 voltage source $+V_1$, in the junction of the resistor 131 with the voltage supply terminal is connected to ground through the parallel combination of capacitors 132 and 133. When the line 77 is grounded the logic state transmitted by the line changes from a logic 1 supplied by the voltage source $+V_1$ to a logic 0. This sets the flip-flop formed by NAND circuits 135 and 136 with the output of NAND circuit 136 high or representative of a logic 1 and the output of the NAND circuit 135 low or representative of a logic 0. The logic 0 pen tip actuating signal and the logic 1 inversion thereof provided by an inverter 137 are provided to the flip-flop formed by NAND circuits 135 and 136 through a pair of switch "debouncing" NAND circuits 138 and 139. The additional logic signals 141, 142 and 143 provided to the debouncing circuit formed by NAND gates 138 and 189 are generated as illustrated by FIG. 8. The low transition at the output of the NAND circuit 135 provides a pulse through the capacitor 145 which is applied to the parallel load terminal of a counter 146 causing the grounded parallel load input thereof to load all zeros into the counter 146. The parallel load terminal of the counter 146 is also connected through a resistor 148 to a logic 1 voltage source $+V_1$. The downcount terminal of the counter 146 is connected through a resistor 147 to a positive logic 1 voltage source $+V_1$, and the upcount input thereof is clocked by the output of a timer circuit 151 which is connected utilizing a voltage source $+V_1$, resistors 152 and 153, and a capacitor 154 to function as a multivibrator having a 250 millisecond period. After 16counts from the timer 151 to the counter 146 (4 seconds) the "carry" link of the counter 146 provides a logic 0 output to an AND circuit 156 and terminates the light pen cycle. In addition, a logic 0 can be provided to the AND circuit 156 as a reset signal 157 either manually or automatically at the end of data location position data transfer. Providing a logic 0 to either input of the AND circuit 156 will provide a logic 0 output which is applied to the "set" terminals of flip-flops 161, 162, and 163 as well as to the input of a NAND circuit 165 which is connected with a NAND circuit 166 to form a flip-flop.

The transition to a logic 1 state by the output terminal of the NAND gate 136 sets the Q output line 168 of the flip-flop 161 to a logic 1 state and the $\overline{Q}$ output line 169 to a logic state since the J and $\overline{K}$ terminals thereof are connected to a logic 1 voltage source through a resistor 171 and the clock input terminal thereof is connected to the output of the NAND circuit 136. At the same time the Q output line 174 of the flip-flop 162 is reset to a logic 0 and the $\overline{Q}$ output line 175 thereof becomes a logic 1 since its J and $\overline{K}$ inputs are grounded and its clock input is connected to the output of the NAND gate 136. The "reset" terminal of the flip-flop 162 is connected through a resistor 176 to a logic 1 voltage source. At this point the NAND circuit 181 is provided with a logic 0 input from the output of the NAND circuit 135 and a logic 1 input from the Q input 168 of the flip-flop 161 and supplies a logic 1 signal as an input to the NAND circuit 165. The NAND circuit 182 is provided with a logic 1 input from the NAND circuit 136 and a logic 1 input from the $\overline{Q}$ output 175 of the flip-flop 162. In addition a suitable vertical synchronization signal is applied as an input thereto. With the vertical synchronization signal in a logic 0 state, the output of the NAND circuit 182 is a logic 1. On the first vertical synchronization pulse following the setting of the flip-flop 161 and resetting of the flip-flop 162, the output of the NAND circuit 182 becomes a logic 0 with the resulting effect that the flip-flop formed by the combination of NAND circuits 165 and 166 will provide a logic 1 cursor enable signal 185 as the output of the NAND circuit 166 and a logic 0 signal 186 as an output of the NAND circuit 165. Although the logic 0 signal 186 can be used for any appropriate purpose, it is preferably used to defeat the generation of any signals otherwise emanating from associated electronic equipment which might interfere with the generation and/or detection of the flying cursor display to be initiated.

The AND circuit 188, having been provided with a logic 1 input by the Q signal 168 of the flip-flop 161 will pass each logic 1 vertical synchronization signal 33 as a signal 189 suitable for use as an input to a vertical synchronization counter.

A $\overline{\text{scan 10}}$ signal 191 is applied to one input of a NAND circuit 192 which is connected with a NAND circuit 193 to form a flip-flop. An end horizontal signal 194 is provided as an input to the NAND circuit 193. The $\overline{\text{scan 10}}$ signal 191 is characterized by its remaining a logic 1 except when the tenth line or last line of each scan making up the display of a row of $\overline{\text{data locations}}$ is being or is about to be scanned. The end horizontal signal 194 remains in a logic 1 state during each horizontal scan but is switched to a logic 0 state at some appropriate time during the horizontal raster retrace, prior to the beginning of the next horizontal scan. The output of the NAND circuit 192 therefore becomes a suitable tenth scan signal 35 which remains in a logic 1 state throughout each tenth horizontal scan of the raster display and therefore throughout each scan upon which cursors are to appear. At the end of the tenth scan the signal 194 resets the tenth scan signal 35 to a logic 0. Additional redundant resets by the signal 194 at the end of subsequent lines will not change the state of the output of the NAND circuit 192 until a logic 0 signal once again appears as signal 191 immediately before the beginning of a subsequent tenth horizontal scan.

Both signals 185 and 35 are provided as inputs to NAND circuits 201 and 202. When the flying cursor generating circuitry is enabled with signal 185 being a logic 1 and the horizontal trace is in the tenth scan of a row of data locations as evidenced by a logic 1 signal 35, the output signal 203 of the NAND circuit 202 will be a logic 0. At other times the output signal 203 will be a logic 1. As long as the cursor detect signal 126 provided from the circuit of FIG. 6 remains a logic 0, the output of the NAND circuit 201 provided to the reset terminal of the flip-flop 161 will remain a logic 1 and will not change the condition of the flip-flop 161. If, however, during a time when signals 185 and 35 are both in a logic 1 state, i.e., the flying cursor pattern is being generated and the horizontal scan of the raster display is on the scan during which cursors are being generated, the detection of a cursor by the light pen and resulting change of the cursor detect signal 126 to a logic 1 will cause the output of the NAND gate 201 to become a logic 0. The application of a logic 0 to the reset terminal of the flip-flop 161 will force the output signals 168 and 169 thereof to become a logic 0 and a logic 1, respectively. When this happens the logic 0 signal 168 applied to the input of the AND circuit 188 blocks the transmission of any more vertical synchronization signals as signal 189 to be counted, thereby effectively halting the vertical synchronization counter. The output of the NAND circuit 181 will remain unchanged since the output thereof has already been forced to a logic 1 by the zero input from the NAND circuit 135. Since the change of the $\overline{Q}$ signal 169 from the flip-flop 161 represents the detection of a cursor by the light pen, the signal 169 can be provided directly as a signal capable of operating latch means or other circuitry required to record or communicate the location at which the cursor was detected.

At this time, with a logic 1 signal being provided by the signal 169 an as input to the AND circuit 206, the application of a grounded pen barrel signal on line 87 inverted by an inverting means 207 to a logic 1 state will cause a logic 1 signal to be applied from the AND circuit 206 to the clock input of the flip-flop 163. Since the J and $\overline{K}$ input terminals of the flip-flop 163 are grounded and logic 1 signals are being provided to the set input by the AND circuit 156 and to the reset input through a resistor 208 from a logic 1 voltage source, the application of a logic 1 to the clock input terminal will cause the $\overline{Q}$ output signal 209 thereof to become a logic 1. Because the line 87 is connected to a logic 1 voltage source through a resistor 211 to provide a logic 0 input to the AND circuit 206 except when the switch means 85 of the light pen is closed, closing of the switch means 85 after a cursor has been detected will generate a logic 1 signal 209 which can be used to initiate transfer of the target data location address at which the cursor was detected to other equipment for appropriate action. The parallel combination of capacitors 212 and 213 are connected between the positive side of the resistor 211 and ground and a capacitor 214 is connected between the output of the inverter 607 and ground.

Referring now to FIG. 8, a counting means 221 accepts the signal 189, which is generated each time a vertical synchronization signal 33 appears following initiation of the flying cursor display, and provides a three-bit binary output signal 222 representative of the number of such relayed vertical synchronization signals counted as inputs to a comparator 224 and as three of the inputs to a four input latch means 226. Appropriate terminals on the counting means 221 are grounded or connected to a logic 1 voltage source through a resistor 223 in order to provide desired initial conditions within the counting means 221.

A pair of counting means 231 and 232 are connected together with the carry output terminal of the counter 231 being connected to the upcount input terminal of the counting means 232 in order to provide a combined capability of counting the eighty characters by each horizontal scan of the raster display. Suitable initializing conditions are provided by resistors 233 and 234 connected to a logic 1 voltage source. At the end of each horizontal sweep the end horizontal signal 194 is applied to the reset input terminal of the counting circuits 231 and 232 in order to reinitialize the circuits for counting the characters swept by the next horizontal scan. The three last significant bits of the combined seven-bit counting circuit are provided as a signal 236 to the comparator 224 which produces a logic 1 output signal whenever the three-bit signal 222 and the three-bit signal 236 are identical. The four most significant bits from the counting means comprising counters 231 and 232 are provided as a signal 238 as inputs to a comparator 239.

With a logic 0 signal 169 indicating the absence of a detected cursor, the AND circuit 284 will be provided with two logic 1 inputs thereto each time the comparator 224 detects identity between the signals 222 and 236. When this condition occurs, the AND circuit 284 will provide a logic 1 input to the NAND circuit 285 which, along with the logic 1 input 185 will produce an output signal 287 which is in a logic 0 state and will call for the generation of a cursor on each horizontal scan of the data locations specified by the count of the signal 222. Application of the signal 287 and the $\overline{\text{scan 10}}$ signal 191 to the inputs of a NAND circuit 289 produces a logic 1 flying cursor on only the tenth scan line of each horizontal data location specified by the count of signal 222.

An inverting means 241 inverts the character count signal 34 and applies it to the clock input terminal of a flip-flop 242. The J and $\overline{\text{K}}$ terminals of the flip-flop 242 are connected to ground or logic 0, the reset terminal of the flip-flop 242 is connected by a resistor 243 to a logic 1 voltage source, and the end horizontal circuit 194 is applied to the set terminal of the flip-flop 242. At the end of each horizontal line, therefore, the flip-flop 242 is set with the $\overline{\text{Q}}$ terminal producing a logic 0 signal 244 which is applied as an input to a NAND circuit 245. As the succeeding horizontal sweep begins, however, the signal 194 is a logic 1 and the first character count 34 inverted by the inverter 241 applied to the clock input terminal of the flip-flop 242 resets the flip-flop 242 and causes the $\overline{\text{Q}}$ signal 244 thereof to become a logic 1. The output of the NAND circuit 245 will remain a logic 1 until the output of the comparator 224 becomes a logic 1. At that time the output of the NAND circuit 245 will become a logic 0 and will initiate the addition of one count to a counting means 248. As with the other counting means illustrated, a resistor 249 is provided to permit setting of initial conditions from a logic 1 voltage source. It can therefore be seen that the output of the counting means 248 will be nominally the same as the four most significant bits, signal 238, from the combined counting means 231 and 232. However, the count within the counting means 248 will not be augmented until the generation of each cursor signal in the flying cursor display. While the output of the combined counting means 231 and 232 will always maintain an accurate indication of the exact present horizontal sweep location, the output of the counting means 248 will always provide an exact indication of the condition of the four most significant bits which were exhibited by the counting means 231 and 232 at the time the last cursor was generated and therefore provides an effective memory having a duration equal to the time required for the horizontal scan to travel from one cursor position to the next. The need for some means of accomplishing the function of the counting means 248 can be seen in view of the fact that, depending upon the cursor location defined by the condition of the output from the counting means 221, the least significant of the four most significant bits in the signal 238 could change as early as one count following the generation of a cursor. When this is the case, the output of the counting means 248 still maintains a record of the location at which a cursor appeared for seven character spaces, thereby insuring sufficient time for a cursor to be detected and a cursor detection signal generated. The four-bit output signal from the counting means 248 is applied to latching means, one bit to latch means 226 and the other three bits to latch means 251.

The tenth scan signal 35 is applied to the up counting input of a counting means 253 which can be appropriately initialized by application of a logic 1 voltage source through a resistor 254 to appropriate initializing terminals thereof. The four-bit capability of the counting means 253 is augmented by the addition of a flip-flop 256 which has its clock the input terminal connected to the carry output terminal of the counting means 253, its J and reset input terminals connected to a resistor 257 to a logic 1 voltage source, and its $\overline{\text{K}}$ input terminal grounded. With both the counting means 253 and flip-flop 256 having been initialized by the application of a vertical synchronization signal 33 through an inverting means 261 at the beginning of each vertical scan, the five-bit output signal 264 of the combined counting means formed by the counter 253 and flip-flop 256 will be representative of the row of data locations being scanned and therefore the row of data locations at which a cursor may appear. The fourth most significant bit from the counter 253 is applied to an inverting means 262 to provide a signal 142. The signal 142 along with signals 141 and 143 taken from the $\overline{\text{Q}}$ and Q output terminals of the flip-flop 256 respectively are provided as the "debouncing" signals to NAND gates 138 and 139 of FIG. 7. The use of signals 141, 142 and 143 in this way prevents initiation of a flying cursor pattern before the switch means 76 of the light pen has reached a stable closed position by delaying initiation of the setting of the flip-flop formed by NAND circuits 135 and 136 of FIG. 7 if closure of the switch means 76 comes too soon before the generation of the next vertical synchronization signal to permit quieting of the switch to take place.

The five-bit output signal 264 is applied to appropriate latch means, in this case one bit is applied to latch means 251 and the other four bits are applied to latch means 266. The five-bit signal 264 is also applied to a comparator 267.

When the detection of cursor causes the flip-flop 161 of FIG. 7 to be reset and an appropriate signal 169 to be generated, the outputs of each of the latching means 226, 251, and 266 are fixed at logic states identical to the corresponding previously described inputs thereto. In this connection an output signal 271 will be provided indicating the condition of the signal 222, and therefore the specific location within a group of eight possible data locations at which the cursor was detected. An output signal 272 will represent the condition of the output signals from the counting means 248 at the time the cursor was detected and will therefore define the group of eight data locations within a horizontal row of such locations in which the cursor was detected. An output signal 273 will represent the condition of the signal 264 at the time the cursor was detected and will indicate the row in which the cursor was detected. Altogether, the signals 271, 272 and 273 define the specific target data location at which a cursor was observed. While the logic 0 state of the signal 169 prior to detection of a cursor forced a logic 1 output signal from the NAND circuit 283, following detection of a cursor the signal 169 will become a logic 1. At this time, however, latched signals 272 and 273 are provided as fixed inputs to the comparators 239 and 267 respectively so that a logic 1 signal will be generated by the comparator 239 each time the signal 238 is equal to the signal 272 and the comparator 267 will similarly generate a logic 1 output signal whenever the input signals 264 and 273 thereto are identical. When all nine bits of signals 238 and 264 are identical to the corresponding latch bits, the output of the NAND circuit 281 will therefore become a logic 0, forcing the output of the NAND circuit 283 to become a logic 1 and thereby permitting the output of the AND circuit 284 to become a logic 1 only when the comparator 224 also generates a logic 1 output signal indicating identity of the three least significant bits 236 of the character counting circuit with the output signal 222 of the now stopped counting means 221. With a logic 1 output from the AND circuit 284 and a logic 1 signal 185, the NAND circuit 285 will produce a logic 0 output signal 287 calling for the generation of a cursor during each horizontal scan of the target data location. After a logic 1 latch signal 169 has been generated, a logic 0 signal applied as an input to the AND circuit 284 by the output of the NAND circuit 283 will prevent generation of a logic 0 signal 287 whenever either of the inputs to the NAND circuit 281 is a logic 0 indicating the absence of a match by the signals provided to one or both of the comparators 239 and 267. Application of the signal 287 and the scan 10 signal 191 to the inputs of the NAND circuit 289 produces a logic 1 confirmation cursor on only the tenth scan line of each horizontal data location specified by the output of the NAND circuit 281.

While any suitable components can be used in the implementation of the invention, the particularly preferred embodiment of the invention illustrated by FIGS. 6–8 can be suitably implemented using the following components:

| | |
|---|---|
| Differential amplifier 92 | No. µA 733 Fairchild Semiconductor Fairchild Camera and Instrument Corp. 464 Ellis St. Mt. View, Calif. 94042 |
| Transformer 106 | T-16-1 pulse transformer Mini Circuits Laboratories 837-843 Utica Ave., Brooklyn, N.Y. 11203 |
| Amplifier 109 and NAND circuit 125 | NE526A Signetics Corp. 811 E. Arque Ave. Sunnyvale, Calif. 94086 |
| NAND circuits 138,139,165,182 and 201 | No. 9003-DC Fairchild Semiconductor |
| NAND circuits 135,136,166,181,192, 193,202,245,281,283 and 285 | No. 9002-DC Fairchild Semiconductor |
| Flip-flops 161,162,163,242 and 256 | No. 9024-DC Fairchild Semiconductor |
| Timer 151 | NE555 Signetics Corp. |
| Counter 146,231,232,248 and 253 | No. SN74193N Texas Instruments, Inc. Box 5012 ML84, Dallas, Texas 75222 |
| Counter 221 | 93L16-PC Fairchild Semiconductor |
| Comparators 224 and 248 | No. 9324-PC Fairchild Semiconductor |
| Comparator 267 | No. 93L24-PC Fairchild Semiconductor |
| Latches 226,251 and 266 | 9314-PC Fairchild Semiconductor |
| Capacitors 101,103,116,122,128,132, 145,212 and 214 | 0.01 microfarad |
| Capacitors 102,104,110,117,123,129, 133 and 213 | 3.3 microfarads |
| Capacitor 154 | 1 microfarad |
| Resistors 95,96,115,121 and 127 | 47 ohms |
| Resistor 108 | 100 ohms |
| Resistors 223,233,234 and 254 | 1 kilohm |
| Resistors 171 and 257 | 2.2 kilohms |
| Resistor 91 | 3.9 kilohms |
| Resistors 107,112,147,148,176,208,227, 243,249,252 and 268 | 4.7 kilohms |
| Resistors 131 and 211 | 15 kilohms |
| Resistors 152 and 153 | 120 kilohms |
| Potentiometers 93 and 11 | 5 kilohms |

Although the method and apparatus of the invention have been described herein in conjunction with a preferred embodiment thereof and with a particularly preferred implementation of that preferred embodiment, the invention can be implemented in a variety of ways using a variety of specific implementing apparatus. Considerable variation and modification by those skilled in the art is possible within the scope of applicant's invention and of the appended claims thereto.

What is claimed is:

1. In a display system wherein a luminescent display is generated by raster scanning having a plurality of scans in a first direction during each successive scan in a transverse direction which is generally perpendicular to said first direction, said display having at least one row of successive data locations along said first direction of said display, a method for communicating the position of a target data location selected from said data locations, said method comprising:
   superimposing over said display a luminescent cursor associated with preselected, periodic, non-successive data locations in each said row of data locations;
   shifting each said cursor a preselected number of data locations along each said row thereof during each of a preselected number of preselected scans in said transverse direction to provide display of a cursor associated with each said data location of said display at least once during a preselected cursor cycle;
   maintaining a signal message representative of the position of the data location which has most recently had a cursor associated therewith; and
   initiating communication of the signal message representative of said target data location in response to the sensing of luminance produced by a cursor associated therewith.

2. A method in accordnce with claim 1 wherein intiating communication of said signal message comprises storing said signal message, and wherein said method additionally comprises continuing to superimpose only a single confirmation cursor associated with said target data location following storing of said signal message.

3. A method in accordance with claim 2 additionally comprising transmitting said stored signal message to communicate the position of said target data location in response to the proper association of said confirmation cursor with said target data location.

4. A method in accordance with claim 1 wherein shifting each said cursor comprises shifting each said cursor to the next successive data location in said row during each succeeding scan in said transverse direction.

5. A method in accordance with claim 4 wherein maintaining said signal message comprises maintaining a cursor shift signal responsive to the number of elapsed sweeps in said transverse direction to provide a portion of said signal message representative of the specific location of the most recently generated cursor in said first direction along the row of data locations.

6. A method in accordance with claim 1 wherein superimposing a cursor associated with periodic, non-successive data location comprises providing a cursor associated with each $2^n$th data location in said row where $n$ is a positive integer.

7. A method in accordance with claim 5 wherein shifting each said cursor comprises shifting each said cursor to the next successive data location in said row during each succeeding scan in said transverse direction.

8. A method in accordance with claim 7 wherein maintaining said signal message comprises maintaining a cursor shift signal responsive to the number of elapsed sweeps in said transverse direction to provide a portion of said signal message representative of the specific location of the most recently generated cursor in said first direction along the row of data locations.

9. A method in accordance with claim 6 wherein providing a cursor associated with each $2^n$ data location comprises providing a cursor associated with each eighth data location in said row.

10. A method in accordance with claim 9 wherein shifting each said cursor comprises shifting each said cursor to the next successive data location in said row during each succeeding scan in said transverse direction.

11. A method in accordance with claim 10 wherein maintaining said signal message comprises maintaining a cursor shift signal responsive to the number of elapsed sweeps in said transverse direction to provide a portion of said signal message representative of the specific location of the most recently generated cursor in said first direction along the row of data locations.

12. A method in accordance with claim 11 wherein initiating communication of said signal message comprises storing said signal message, and wherein said method additionally comprises continuing to superimpose only a single confirmation cursor associated with said target data location following storing of said signal message.

13. A method in accordance with claim 12 additionally comprising transmitting said stored signal message to communicate the position of said target data location in response to the proper association of said confirmation cursor with said target data location.

14. Apparatus comprising:
display means for providing luminescent display in response to raster scanning of a display field by a plurality of scans in a first direction during each successive scan in a transverse direction which is generally perpendicular to said first direction, said luminescent display comprising at least one row of successive data locations along said first direction of said display;
means for superimposing over said display a luminescent cursor associated with preselected, periodic, non-successive data locations in each said row of data locations;
means for shifting each said cursor a preselected number of data locations along each said row thereof during each of a preselected number of preselected scans in said transverse direction to provide display of a cursor associated with each said data location of said display at least once during a preselected cursor cycle;
means for maintaining a signal message representative of the position of the data location which has most recently had a cursor associated therewith; and
means for initiating communication of a signal message representative of a target data location in response to the sensing of luminance produced by a cursor associated with said target data location.

15. Apparatus in accordance with claim 14 wherein said means for initiating communication comprises:
light responsive means capable of being positioned in a preselected relationship to said target data location for producing a target cursor signal responsive to the appearance of a cursor associated with said target data location; and
means for storing the signal message representative of the position of said target data location in response to production of said target cursor signal.

16. Apparatus in accordance with claim 15 additionally comprising means for continuing to superimpose only a single confirmation cursor associated with said target data location following production of said target cursor signal.

17. Apparatus in accordance with claim 16 additionally comprising means for transmitting said stored signal message to communicate the position of said target data location.

18. Apparatus in accordance with claim 14 wherein said means for shifting comprises means for relocating each cursor to associate it with the immediately adjacent data locations in said first direction along said row of data locations during each succeeding scan in said transverse direction.

19. Apparatus in accordance with claim 18 wherein said means for maintaining a signal message comprises means for maintaining a cursor shift signal responsive to the number of elapsed transverse direction sweeps to provide a portion of said signal message representative of the specific location of the most recently generated cursor in said first direction along the row of data locations.

20. Apparatus in accordance with claim 14 wherein said means for superimposing comprises means for providing a cursor associated with each $2^n$th data location in said row where $n$ is a positive integer.

21. Apparatus in accordance with claim 20 wherein said means for shifting comprises means for relocating each cursor to associate it with the immediately adjacent data locations in said first direction along said row of data locations during each succeeding scan in said transverse direction.

22. Apparatus in accordance with claim 21 wherein said means for maintaining a signal message comprises means for maintaining a cursor shift signal responsive to the number of elapsed transverse direction sweeps to provide a portion of said signal message representative of the specific location of the most recently generated cursor in said first direction along the row of data locations.

23. Apparatus in accordance with claim 14 wherein said means for superimposing comprises means for providing a cursor associated with each eighth data location in said row.

24. Apparatus in accordance with claim 23 wherein said means for shifting comprises means for relocating each cursor to associate it with the immediately adjacent data locations in said first direction along said row of data locations during each succeeding scan in said transverse direction.

25. Apparatus in accordance with claim 24 wherein said means for maintaining a signal message comprises means for maintaining a cursor shift signal responsive to the number of elapsed transverse direction sweeps to provide a portion of said signal message representative of the specific location of the most recently generated cursor in said first direction along the row of data locations.

26. Apparatus in accordance with claim 25 wherein said means for initiating communication comprises:
light responsive means capable of being positioned in a preselected relationship to said target data location for producing a target cursor signal responsive to the appearance of a cursor associated with said target data location; and means for storing the signal message representative of the position of said target data location in response to production of said target cursor signal.

27. Apparatus in accordance with claim 26 additionally comprising means for continuing to superimpose only a single confirmation cursor associated with said target data location following production of said target cursor signal.

28. Apparatus in accordance with claim 27 additionally comprising means for transmitting said stored signal message to communicate the position of said target data location.

29. Apparatus in accordance with claim 28 wherein said display means provides a display field having 24 rows of 80 data locations each.

* * * * *